(12) United States Patent
Davis (10) Patent No.: US 7,250,869 B2
(45) Date of Patent: Jul. 31, 2007

(54) CHILD CARSEAT ALERT SYSTEM

(76) Inventor: Le'Roychelle Davis, P.O. Box 166, Freeport, NY (US) 11520

( * ) Notice: Subject to any disclaimer, the term of this patent is extended or adjusted under 35 U.S.C. 154(b) by 150 days.

(21) Appl. No.: 11/085,311

(22) Filed: Mar. 21, 2005

(65) Prior Publication Data

US 2006/0208911 A1 Sep. 21, 2006

(51) Int. Cl.
*G08B 23/00* (2006.01)
(52) U.S. Cl. .............. 340/573.1; 340/539.11; 340/667; 340/691.1
(58) Field of Classification Search ........... 340/573.1, 340/573.4, 693.5, 666, 667, 457.1, 687, 522, 340/539.1, 539.11, 691.1
See application file for complete search history.

(56) References Cited

U.S. PATENT DOCUMENTS

| | | | |
|---|---|---|---|
| 3,226,674 A | 12/1965 | Eriksson | |
| 3,624,601 A | 11/1971 | Routzahn et al. | |
| 4,107,645 A | 8/1978 | Lewis et al. | |
| 5,406,252 A | 4/1995 | Dear | |
| 5,483,221 A | 1/1996 | Mutter et al. | |
| 5,627,512 A | 5/1997 | Bogar | |
| 5,770,997 A | 6/1998 | Kleinberg et al. | |
| 5,949,340 A * | 9/1999 | Rossi | 340/573.1 |
| 6,002,325 A | 12/1999 | Conaway | |
| 6,362,734 B1 | 3/2002 | McQuade et al. | |
| 6,489,889 B1 * | 12/2002 | Smith | 340/457.1 |
| 6,501,374 B1 | 12/2002 | King et al. | |
| 6,535,137 B1 * | 3/2003 | Ryan | 340/687 |
| 6,714,132 B2 | 3/2004 | Edwards et al. | |
| 6,922,147 B1 * | 7/2005 | Viksnins et al. | 340/573.1 |
| 6,924,742 B2 * | 8/2005 | Mesina | 340/573.1 |
| 2002/0161501 A1 * | 10/2002 | Dulin et al. | 701/45 |
| 2003/0062996 A1 | 4/2003 | Flanagan et al. | |
| 2003/0132838 A1 * | 7/2003 | Toles | 340/457 |
| 2003/0222775 A1 * | 12/2003 | Rackham et al. | 340/573.1 |
| 2004/0113797 A1 * | 6/2004 | Osborne | 340/573.4 |
| 2005/0062595 A1 * | 3/2005 | Hofbeck et al. | 340/457.1 |

FOREIGN PATENT DOCUMENTS

| | | |
|---|---|---|
| DE | 3.432.088 | 2/1985 |
| GB | 1.406.864 | 10/1982 |

* cited by examiner

*Primary Examiner*—Thomas Mullen
(74) *Attorney, Agent, or Firm*—Michael I. Kroll (57) ABSTRACT

A device for alerting a user to the presence of a child in a vehicle comprising a housing having a first sensor for sensing the presence of at least one of a child and infant positioned therein. A means for detecting the operative mode of a vehicle engine is connected to the first sensor. A means for indicating the presence to a third party is connected to the first sensor. The indicating means is activated and indicates to the third party the presence of said at least one child and infant upon the detecting means detecting that the vehicle engine is in a first off mode and the first sensor sensing the presence of the at least one child and infant.

23 Claims, 7 Drawing Sheets

CHILD CARSEAT ALERT SYSTEM

BACKGROUND OF THE INVENTION

1. Field of the Invention

The present invention relates to an alert system, and more specifically, to a child car seat that incorporates sensors, which are in communication with a vehicle electrical system. When an engine is stopped, the sensors signal a remote, which in turn engages an indicator, such as a tone. The indicator alerts any passengers in a vehicle or people located within a predetermined distance of the vehicle that the engine is off and that a child remains in the child car seat. Thus, the indicator reduces the likelihood of inadvertently leaving a child in a vehicle unattended.

2. Description of the Prior Art

Numerous other seatbelt alert systems exist in the prior art. Typical of these are U.S. Pat. Nos. 3,226,674; 3,624,601; 4,107,645; 5,483,221; 5,406,252; 5,627,512; 5,770,997; 6,002,325; 6,362,734; 6,501,374; 6,714,132; 2003/62996; and International Patent Applications UK GB1406864; DE 3432088. While these seatbelt alert systems may be suitable for the purposes for which they were designed, they would not be as suitable for the purposes of the present invention, as hereinafter described.

U.S. Pat. No. 3,226,674

Inventor: Leif Joel Verner Eriksson

Issued: Dec. 28, 1965

Safety belts are presently a rather common piece of equipment in automobiles, but experience has shown that many drivers and passengers forget or just neglect to use the belts. The present invention has for its object to provide an arrangement which is dependent on whether or not the safety belt or belts in an automobile are in use, in such a way, that, when the belt is not put on, the driver's attention is directed to that fact upon the automobile reaching a certain velocity, either by means of an alarm or by means of mechanisms that cause the engine to stop or, in any case, prevent further increase in velocity of the vehicle.

U.S. Pat. No. 3,624,601

Inventor: William S. Routzahn et al.

Issued: Nov. 30, 1971

A safety seatbelt that is constructed so that a vehicle cannot be operated until the seatbelt is properly fastened about a person, and wherein the seatbelt is electrically connected to the ignition switch of a vehicle, so that the circuit cannot be completed and the engine operated until the seatbelt is properly connected in place. In one form of the device, a seatbelt is provided for aircraft, buses, and trains, and a lighting system of warning indicates when one or more passengers does not have his or her seatbelt engaged.

U.S. Pat. No. 4,107,645

Inventor: Donald J. Lewis et al.

Issued: May 22, 1972

An automobile equipped with seat belts for the front passengers includes retractors for withdrawing the belts when not in use. Each seat equipped with a belt includes a pressure sensor to provide a signal when the seat is occupied. The retractors include switches indicating whether the belts are extended or retracted. A logic circuit receives the outputs of the sensor and the switches and inhibits the output of power to the starter until the pressure sensors first provide signals indicating the seats are occupied and then the switches associated with each such retractor provide signals indicating the belts have been extended. When an attempt is made to start the car in a normal manner and this sequence of conditions has not occurred, an alarm is sounded as well as the starter being inhibited. Means are provided for allowing the application of power to the starter motor and extinguishing the alarm in the absence of the proper sequence of signals under the control of the driver, in an emergency or when the car stalls.

U.S. Pat. No. 5,483,221

Inventor: Douglas R. Mutter et al.

Issued: Jan. 9, 1996

Seat belts in a vehicle are monitored, and a reminder is initiated in response to a restraint sensor indicating the engaged or nonengaged state of a seat restraint, a vehicle sensor indicating when the vehicle is in use, an annunciator controllably producing a reminder, and an electronic control controlling the annunciator. The reminder is produced when the seat restraint is in a nonengaged state after having been an engaged state while the vehicle is in use. Thus, monitoring of the continued buckling of a seat belt, especially a rear seat belt, is provided without need for seat occupancy sensors.

U.S. Pat. No. 5,406,252

Inventor: Timothy W. Dear

Issued: Apr. 11, 1995

A device primarily for indicating when a seat belt is disconnected comprises an electronic unit housed in or on the buckle of the seat belt, and including a switch, the condition of which is altered on insertion and removal of the seat belt key into and from the buckle. On insertion of the key into the buckle a first signal indicative of connection of the seat belt is transmitted from the device and, on removal of the key from the buckle, a second signal indicative of disconnection of the seat belt is transmitted from the device.

U.S. Pat. No. 5,627,512

Inventor: Marcia M. Bogar

Issued: May 6, 1997

A seat belt safety alarm comprised of a housing having a slotted opening in a side thereof. The housing has a heel secured therein adjacent to the slotted opening. The slotted opening is adapted to receive a seat belt tongue therein with the tongue fitting over the heel. The housing has a wall therein inwardly of the heel. A battery is secured within the housing. A circuit board is secured within the housing disposed above the battery. The circuit board has a wire electrically coupled with the battery. A speaker is secured within the top of the housing disposed above the circuit board. The speaker has a wire coupled to the circuit board. A tongue is secured to a side of the housing. The tongue is adapted for coupling with a seat belt buckle. A sensor switch is secured within the housing. The sensor switch has a wire coupled with the circuit board. The sensor switch has a switch portion extending outwardly of the housing disposed above the first end of the tongue.

U.S. Pat. No. 5,770,997

Inventor: Raymond Kleinberg et al.

Issued: Jun. 23, 1998

A system for sensing the presence of an object within a vehicle's passenger compartment including an occupant in a motor vehicle comprising one or more safety restraint devices and a first occupant sensor, fixedly positioned in the vehicle, for generating a reflected electric field within the passenger compartment for generating an output signal indicative of the presence of an object, the sensor mounted on one of a vehicle's steering wheel assembly for driver position detection or instrument panel near the passenger air bag module for passenger position detection.

U.S. Pat. No. 6,002,325

Inventor: Brian J. Conaway

Issued: Dec. 14, 1999

A status alerting unit for a seat belt having a connectable buckle and tongue, particularly for use in the supervision of children riding in a vehicle. The unit has a housing mountable to the seat belt buckle. A proximity sensor, such as a pivoting flipper element, is deflected when the seat belt tongue is inserted into the buckle, and generates BUCKLED and UNBUCKLED signals. An audible alert device generates appropriate alert signals in response. A low battery voltage warning is also provided. The unit is self-contained and functions properly with a wide variety of existing seat belt assemblies, without interfering in any way with a user's accustomed seat belt operation, or requiring special care or attention while the tongue is inserted and latched into the buckle.

U.S. Pat. No. 6,362,734

Inventor: Thomas M. McQuade

Issued: Mar. 26, 2002

A system for monitoring the secured/unsecured status of seat belts in rear seating rows of a vehicle notes the number and/or location of seat belts secured at a base time when all doors are closed and the vehicle starts in motion. The vehicle operator is alerted to any later change in the number of secured belts by a visual display provided by a vehicle message center and/or an audible signal. When the vehicle slows to a stop and a door opens, the number of secured belts is reset to allow continued monitoring of rear seat occupants after occupants are dropped off and/or picked up. The secured/unsecured condition may be determined by monitoring a retractor reel of the seat belt, the secured condition being defined by the seat belt being paid out beyond a threshold length and the unsecured condition being defined by the seat belt being retracted shorter than the threshold length. Seat occupancy sensors are not required, and rear seat occupants may temporarily unfasten their seat belt as necessary to move from one seating position to another without continuous alerting of the vehicle operator.

U.S. Pat. No. 6,501,374

Inventor: Daniel M. King et al.

Issued: Dec. 31, 2002

A secondary seat belt warning system for a motor vehicle includes at least one control module for activating at least one secondary warning signal. The secondary seat belt warning system also includes a driver seat belt sensor for producing an input signal indicative of a state of a driver seat belt between a buckled and unbuckled condition. The secondary seat belt warning system includes at least one passenger seat belt sensor for producing an input signal indicative of a state of at least one passenger seat belt between a buckled and unbuckled condition. The at least one control module communicates with the driver seat belt sensor and the at least one passenger seat belt sensor for activating the at least one secondary warning signal to alert a corresponding occupant of the motor vehicle if the state of at least one of the driver seat belt and the at least one passenger seat belt is the unbuckled condition.

U.S. Pat. No. 6,714,132

Inventor: William Christopher Edwards et al.

Issued: Mar. 30, 2004

A system and method uses a wireless tether comprising a transmitter and a receiver to alert a caregiver that an object or person has been left unattended. A detector senses the presence of the object, usually a child, located in a position such as a safety seat. The detector couples to the transmitter, which is located near the object. The transmitter transmits at least one wireless signal when the object is in the position. The receiver, which is remotely located from the transmitter, senses the at least one signal as long as the receiver is within a prescribed range of transmission. By performing a timing function, the receiver monitors the proximity of the caregiver, who maintains possession of the receiver, to the transmitter. The system communicates an alarm to the caregiver when the caregiver ventures outside the range of transmission without having removed the object/child from the position.

British Patent Application GB1406864

Inventor: Center AB

Filed: Sep. 17, 1995

Safety belt buckles CENTER AB 12 Oct. 1972 [14 Oct. 1971] 47143/72 Heading E2A A safety belt buckle comprises a housing 10, a tongue 13 co-operable with the housing by mutually engaging abutment surfaces and a latch member 18 which is spring biased into its locking position in which it retains the housing 10 and tongue 13 in abutting relationship. The latch member 18 is actuated through an intermediate member 24 by a push button 27 and comprises a slide which is displaceably guided in the housing 10. In the construction shown both the push button 27 and intermediate member 24 are pivotally mounted on respective shafts 20, 21 these shafts also serving to hold a cover 19 of the housing 10 to a bottom plate of the housing 10. The abutment surfaces in the housing and tongue and formed by shoulders 16 on the bottom plate 11 and openings 17 respectively. Only one shoulder and one spring may be provided. In a further embodiment (FIGS. 3, 4, not shown) the push button is rectilinearly movable against spring loading the intermediate member comprising a lever pivoted at its ends to the housing and the push button respectively and at its mid portion to a slider working in an opening in the latch member. This embodiment incorporates two similar buckles side by side in a plastics metered block. In a modification of the double buckle (FIGS. 5, 6, 7, not shown) the intermediate member, which comprises a rod rigidly connected to the push button, acts on the latch member by means of a pin attached thereto. A spring loaded slide is also provided which, in the latched condition of the buckle, engages the tongue such that on retraction of the latch member against its spring loading the tongue is ejected from the housing. One lamp is provided in the push button and one lamp is provided in a passage. The passage opens into the mouth of the housing into which the tongue passes. The passage lamp illuminates the mouth prior to the insertion of the tongue and the push button lamp indicates that the buckle is properly fastened. The circuit of the lamps may be incorporated in the ignition system of the vehicle and weight actuated switches are incorporated in the seats for which the safety belt buckles are provided.

German Patent Application DE 3432088

Inventor: Otto Baumgart

Filed: Feb. 21, 1985

This signal transmitter is intended to prevent driving without the safety belt being fitted. The essential feature of this signal transmitter is a reed contact and a permanent magnet which are integrated (at a separation distance of 2 cm) into a plastic part which also contains the acoustic signal transmitter. This plastic part is mounted on the lock of the safety bolt and the cables (positive and negative) are connected. The reed contact is kept closed by the magnet so that switching on causes a signal to be triggered. If the belt is now passed between the magnet and the reed contact into the belt lock, the magnetic field loses its effect on the reed contact, resulting in the latter being opened and the signal being obliterated.

SUMMARY OF THE PRESENT INVENTION

The present invention relates to an alert system, and more specifically, to a child car seat that incorporates sensors, which are in communication with a vehicle electrical system. When an engine is stopped, the sensors signal a remote, which in turn engages an indicator, such as a tone. The indicator alerts any passengers in a vehicle or people located within a predetermined distance of the vehicle that the engine is off and that a child remains in the child car seat. Thus, the indicator reduces the likelihood of inadvertently leaving a child in a vehicle unattended.

A primary object of the present invention is to provide a child car seat alert mechanism that overcomes the shortcomings of the prior art.

A secondary object of the present invention is to provide a child car seat alert mechanism that reminds the driver of the vehicle that the vehicle has stopped and the child remains in the child car seat.

Another object of the present invention is to provide a child car seat alert mechanism whereby the child car seat includes sensors for determining the presence of a child in the car seat Still another object of the present invention is to provide a child car seat alert mechanism that includes a mechanism for determining that the vehicle's engine is running.

A further object of the present invention is to provide a child car seat alert mechanism including a mechanism for communicating with the vehicle's electrical system the information regarding the on/off status of the engine.

Yet another object of the present invention is to provide a child car seat alert mechanism wherein the vehicle electrical system transmits a signal corresponding to the engine's on/off status for receipt by a remote unit.

Another object of the present invention is to provide a child car seat alert mechanism whereby the remote unit activates an indicator for informing a user that the child remains in the child car seat.

Yet another object of the present invention is to provide a child car seat alert mechanism wherein the indicator is positioned on an external surface of the vehicle.

Another object of the present invention is to provide a child car seat alert mechanism whereby the passenger is alerted to a child exiting the child car seat after the engine has started.

A further object of the present invention is to provide a child car seat alert mechanism wherein the indicator is located on an internal surface of the vehicle.

Another object of the present invention is to provide a child car seat alert mechanism including a plurality of indicators, positioned on at least one of an internal surface and an external surface of the vehicle.

Yet another object of the present invention is to provide a child car seat alert mechanism whereby the indicator is at least one of a tone, vibration, flashing or stable light, verbal communication and a combination thereof.

Yet another object of the present invention is to provide a child car seat alert mechanism that is simple and easy to use.

Still yet another object of the present invention is to provide a child car seat alert mechanism that is inexpensive to manufacture and operate.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the car seat alert mechanism of the present invention. With regard to the reference numerals used, the following numbering is used throughout the various drawing Figures.

10 child car seat alert mechanism of the present invention
12 sensor
14 connection link
16 vehicle electrical system
18 signal
20 remote
22 indicator
24 driver
26 child
28 child car seat
30 seatbelt
32 vehicle
36 first switch
38 weight sensor
40 child car seat processor
42 child car seat receiver
44 child car seat transmitter
46 indicator signal
50 engine
52 second switch
54 engine sensor
56 vehicle electrical system processor
58 vehicle electrical system transmitter
60 "off" signal
62 "on" signal

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 7 illustrate a car seat alert mechanism of the present invention which is indicated generally by the reference numeral 10.

Figure 1:
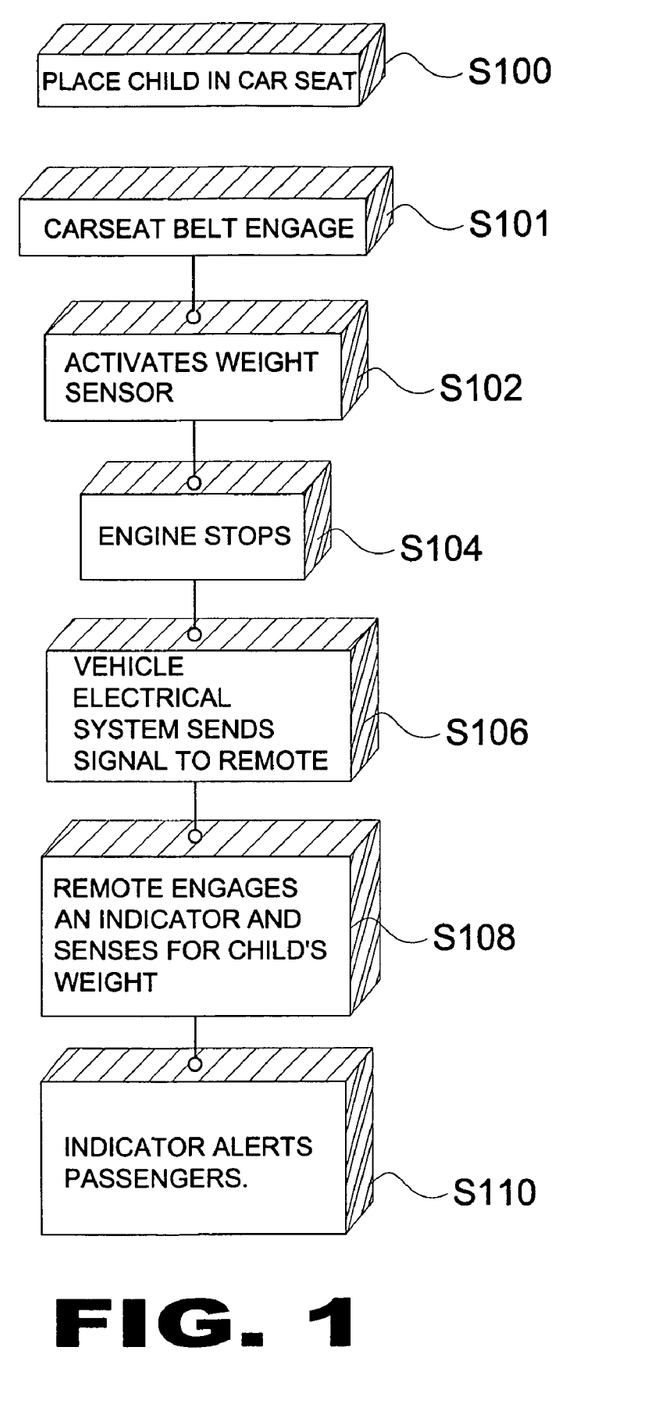
FIG. 1 is a flowchart detailing the operation of the child car seat alert mechanism of the present invention.

FIG. 1 is a flowchart of the child car seat alert mechanism 10 of the present invention. The car seat alert mechanism 10 of the present invention, hereinafter "mechanism", is an alert mechanism to prevent inadvertently leaving a child locked in the child car seat when a vehicle engine is not running. Initially a child is placed in a car seat as shown in step S100. In S101, the child car seat locking device is engaged. The locking mechanism is preferably a seatbelt tab which is received by a buckle thereby locking the tab in place. Thereafter, a weight sensor is activated in step S102. In S104 the engine stops and the vehicle electrical system sends a signal to a remote in S106. The remote, in turn, engages an indicator and senses a weight of a child positioned in the car seat as shown in step S108. The sensor determines if the sensed weight is above a predetermined weight and upon sensing that the weight is greater than or equal to the predetermined weight, the indicator indicates that the child is still present in the child car seat and the indicator alerts the passengers in S110.

Figure 2:
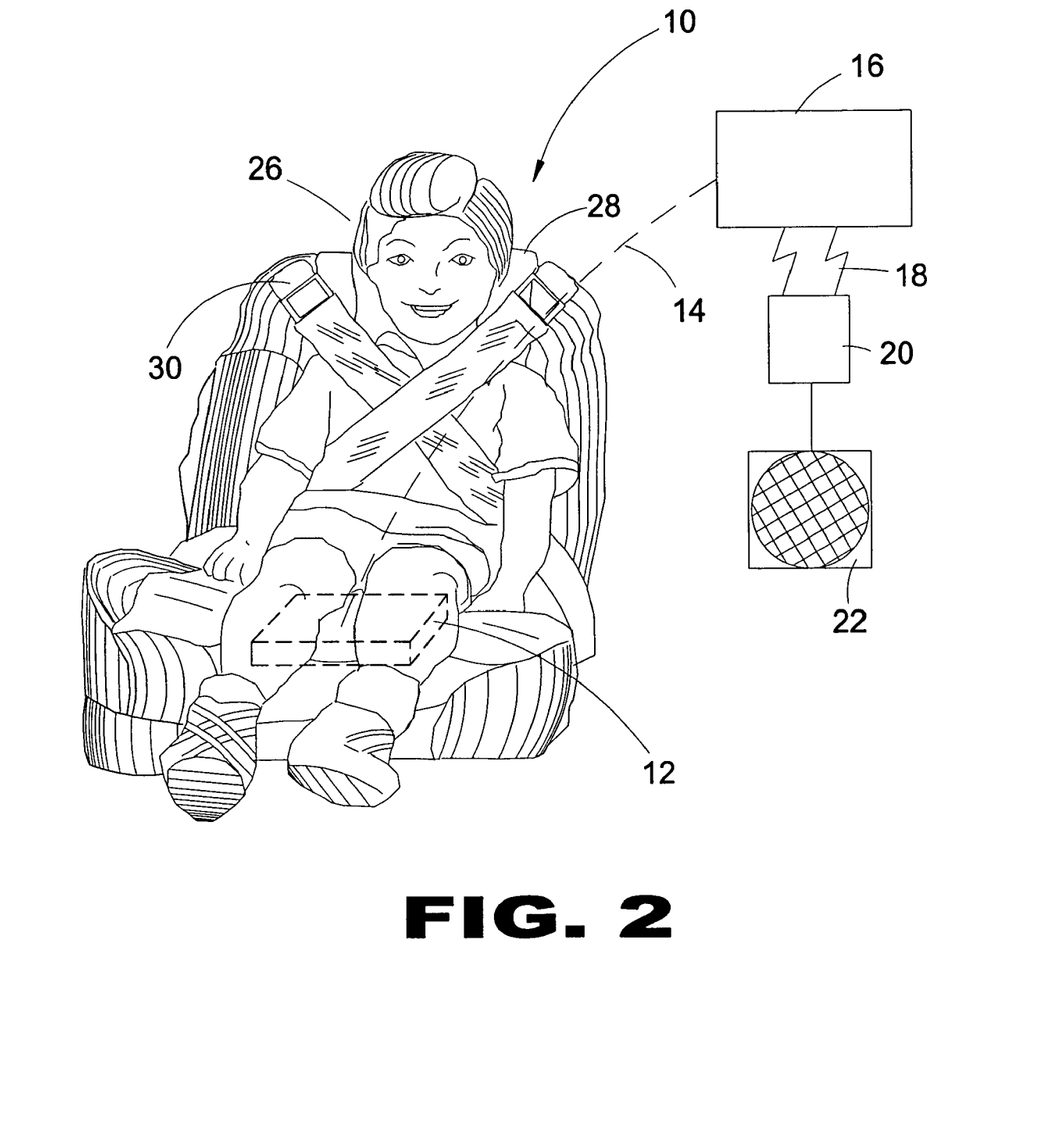
FIG. 2 is a perspective view of the child car seat alert mechanism of the present invention retaining a child therein.

FIG. 2 is a perspective view of the child car seat alert mechanism 10 of the present invention. The mechanism 10 of the present invention is positioned and used in conjunction with a conventional car seat 28 having a restraining mechanism 30 such as a seatbelt for retaining at least one of an infant and child 26 therein. The child 26 sits in the car seat 28 and the seatbelt 30 is fastened around the child 26 to prevent him from leaving his child car seat 28. The mechanism 10 of the present invention is able to sense and subsequently notify a user that the child 26 remains in the car seat 28 when a vehicle engine is not running.

The car seat 28 includes a sensor 12 shown herein in shadow. The sensor 12 is preferably a seat sensor that is positioned immediately under the surface of a seat portion of the car seat 28. The sensor 12 is able to selectively sense an amount of weight positioned thereon. Thus, the sensor 12 is able to sense a weight of the child 26 thereby determining if the child 26 is present in the car seat 28.

The sensor 12 is also connected to a vehicle electrical system 16 via communication link 14. The vehicle electrical system 16 is connected to all mechanical and electrical components of the vehicle, including but not limited to the engine, and the system 16 controls all operation thereof. The vehicle electrical system 16 is further connected to a remote unit 20 having an indicating mechanism 22.

When the user deactivates the vehicle, the vehicle electrical system 16 detects that the engine has been deactivated. The sensor 12 senses whether a weight positioned in the car seat 28 is greater than a predetermined value. If the sensed weight is greater than or equal to the predetermined weight then the sensor 12 communicates via communication link 14 that the sensed weight is greater than the predetermined weight. The vehicle electrical system 16 interprets this to mean that the child 26 is still present in the car seat 28. The system 16 then emits a notification signal 18 for receipt by the remote unit 20. Upon receipt of the notification signal 18, the remote unit 20 activates the indicator 22 for indicating to a user that the child 26 is still present in the car seat. Alternatively, the system 16 may include a time delay mechanism whereby upon receiving the communication from the sensor 12 that the sensed weight is greater than the predetermined weight, the system 16 intentionally pauses for a predetermined amount of time prior to emitting the notification signal 18. This allows the user to have time to actually remove the child prior to sounding an alarm which in that situation would be a false alarm.

Figure 3:
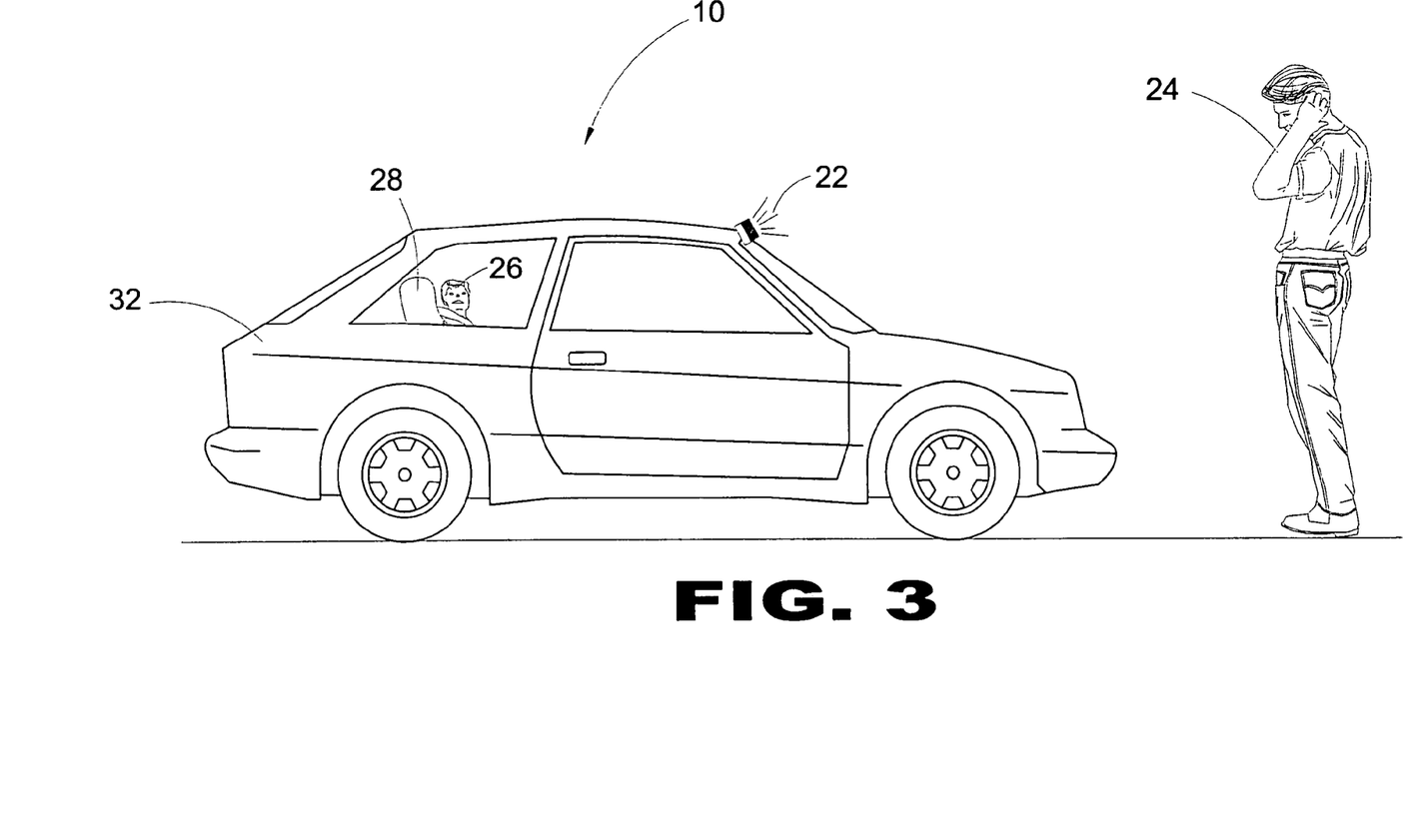
FIG. 3 is an illustrative view of a vehicle including the child car seat alert mechanism of the present invention having the indicator positioned on an external surface of the vehicle.

FIG. 3 is an illustrative view of a vehicle 32 including the child car seat alert mechanism 10 of the present invention. A user 24 is positioned outside of a vehicle 32. The child 26 is positioned in the child car seat 28 which located in the vehicle 32. The vehicle 32 includes the indicator 22 positioned on an external surface thereof. The sensor 12 shown in FIG. 1 is embedded in the child car seat 28 and is engaged and able to selectively determine if the weight positioned thereon is greater than or equal to the predetermined weight thereby indicating that the child 26 is positioned therein.

The engine is in the "off" position, and the child car seat sensor 12 senses that the child 26 remains in the child car seat 28. The indicator 22, herein positioned on an external surface of the vehicle 32, is activated to alert the driver 24 that the child 26 remains in the child car seat 28. The indicator 22 is at least one of a tone, vibration, flashing or stable light, verbal communication and a combination thereof.

Figure 4:
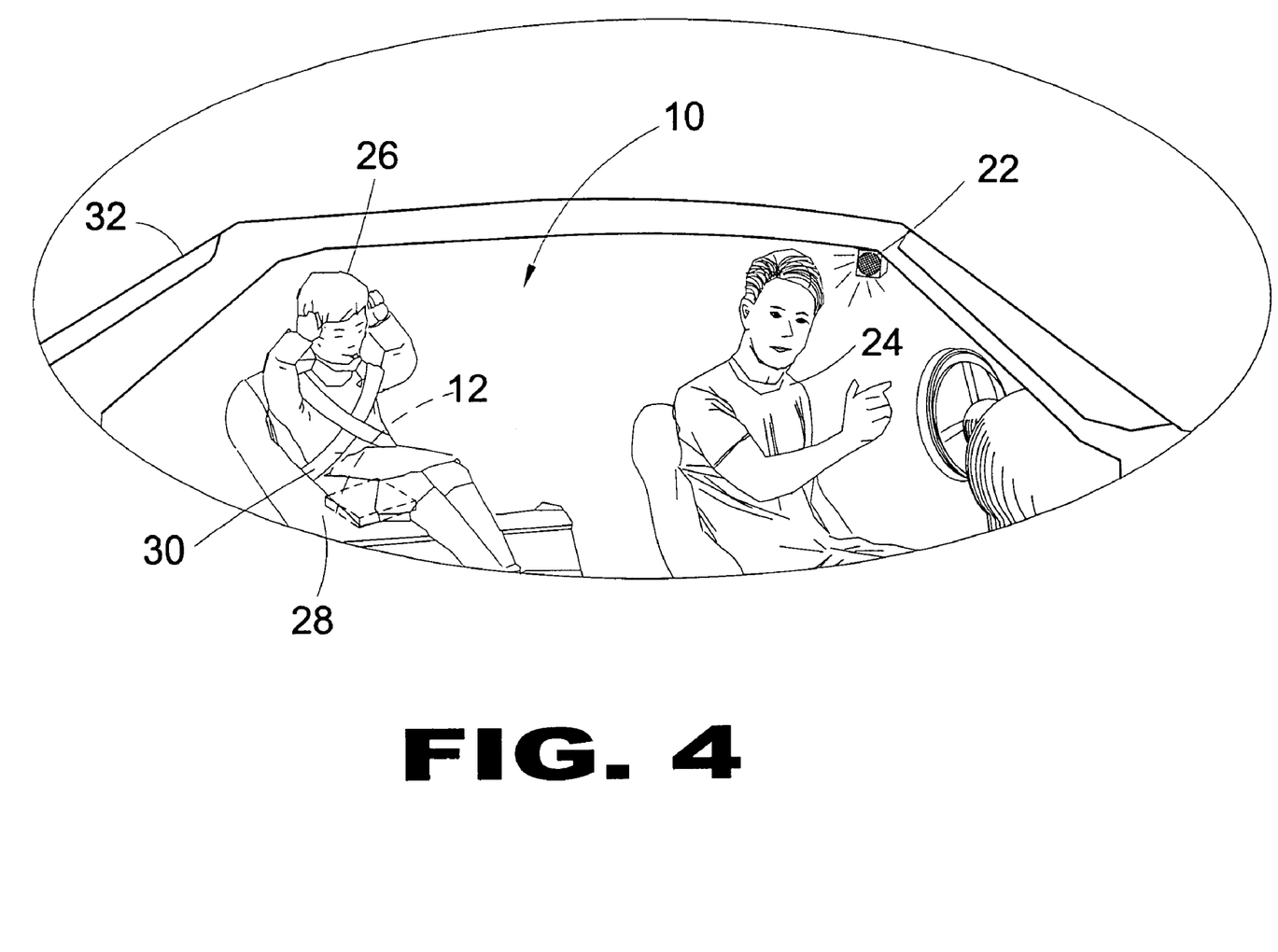
FIG. 4 is an illustrative view of a vehicle including the child car seat alert mechanism of the present invention having the indicator positioned on an internal surface of the vehicle.

FIG. 4 is an illustrative view of a vehicle 32 including the child car seat alert mechanism 10 of the present invention. Herein, the child 26 sits in the child car seat 28 located in the vehicle 32. The child 26 is secured to the child car seat 28 by the seatbelt 30. The child car seat sensor 12 is embedded in the child car seat 28. The driver 24 is located inside the vehicle 32. The driver 24 has turned off the engine 50 and removed the key. The engine 50 is in the "off" position, and the child car seat sensor 12 senses that the child 26 remains in the child car seat 28. The indicator 22, herein positioned on an internal surface of the vehicle 32, is activated to alert the driver 24 that the child 26 remains in the child car seat 28. The indicator 22 is at least one of a tone, vibration, flashing or stable light, verbal communication and a combination thereof.

Alternatively, the mechanism 10 may be linked with the restraining mechanism 30 indicating if the restraining mechanism 30 has been released while the vehicle engine is operating. This alternative operation of the mechanism 10 of the present invention is operable by having the sensor 12 further connected to a switch for detecting that a restraining mechanism 30 is in first secured position and a second unsecured position. While the vehicle engine is engaged, the sensor 12 senses the weight positioned thereon while simultaneously checking if the restraining mechanism is in the first secured position. Upon detecting that the restraining mechanism 30 is in the second unsecured position, the sensor 12 senses if the weight positioned thereon is greater than the predetermined weight. If the sensed weight is greater than the predetermined weight, then the sensor 12 communicates with the vehicle electrical system 16 as shown in FIG. 1 and the system 16 interprets this signal to mean that the restraining mechanism 30 is unsecured. The system 16 then sends the notification signal 18 to the remote unit 20 which activates the indicator 22.

Figure 5:
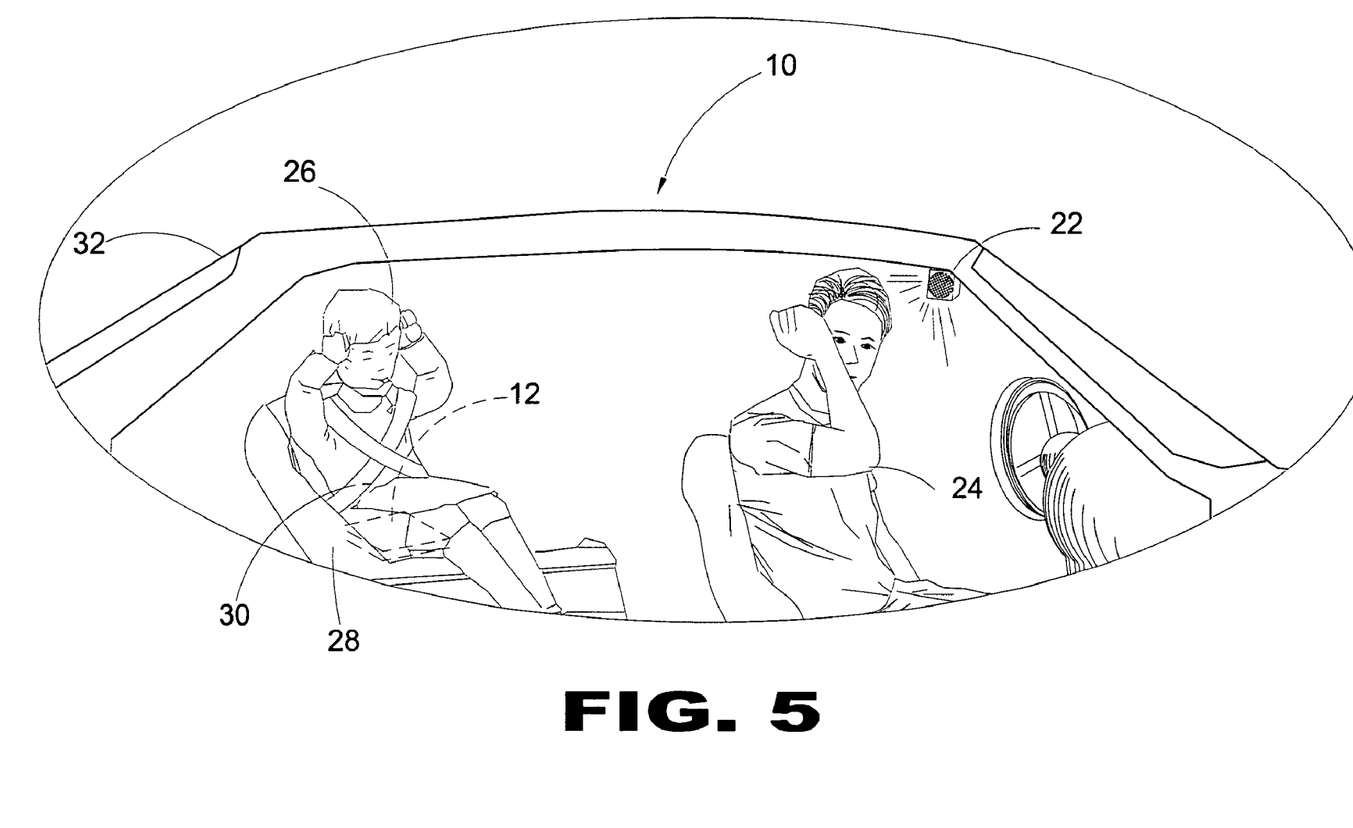
FIG. 5 is an illustrative view of a vehicle including the child car seat alert mechanism of the present invention having a plurality of indicators positioned therein.

FIG. 5 is an illustrative view of a vehicle 32 including the child car seat alert mechanism 10. Herein, the child 26 sits in the child car seat 28 located in the vehicle 32. The child 26 is secured to the child car seat 28 by the seatbelt 30. The child car seat sensor 12 is embedded in the child car seat 28. The driver 24 is located inside the vehicle 32. The driver 24 has turned off the engine 50 and removed the key. The engine 50 is in the "off" position, and the child car seat sensor 12 senses that the child remains in the child car seat 28. The plurality of indicators 22, herein positioned on the external and internal surfaces of the vehicle 32, are activated to alert the driver 24 that the child 26 remains in the child car seat 28. The indicators 22 are at least one of a tone, vibration, flashing or stable light, verbal communication and a combination thereof.

Figure 6:
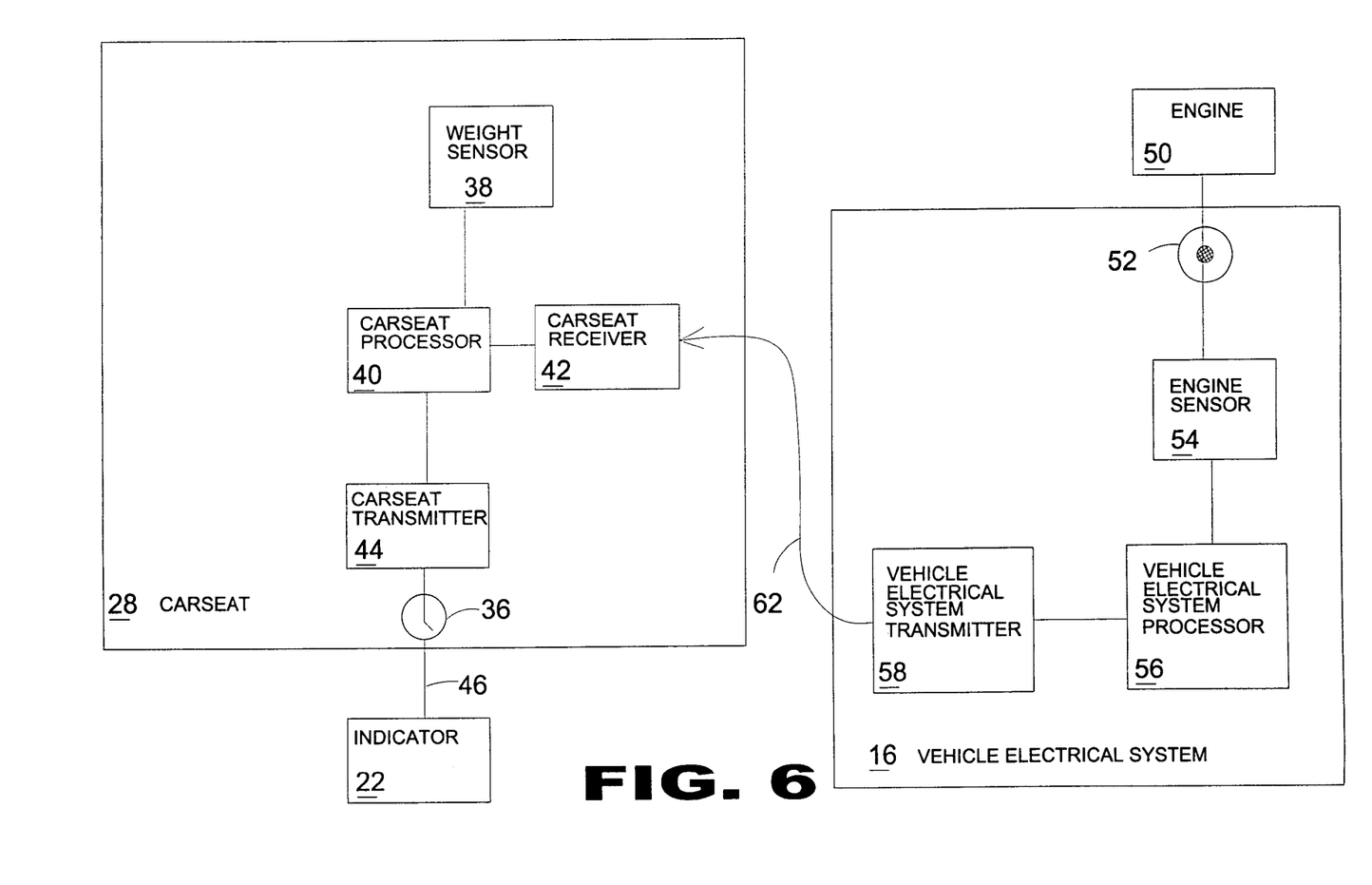
FIG. 6 is a block diagram of the child car seat alert mechanism of the present invention.

FIG. 6 is a block diagram of the child car seat alert mechanism 10 of the present invention. The child car seat 28 includes the sensor 12 positioned therein. The sensor 12 contains a weight sensor 38, a child car seat receiver 42, a child car seat processor 40, a child car seat transmitter 44. The car seat transmitter 44 is connected to an external indicator 22 via a first switch 36 which controls activation of the indicator 22. The vehicle electrical system 16 is connected to the engine 50 of the vehicle via a second switch 52. The vehicle electrical system includes an engine sensor 54, a vehicle electrical system processor 56 and a vehicle electrical system transmitter 58.

Initially, upon a child being positioned within the car seat 28, the weight sensor 38 senses the weight of the child. The car seat processor 40 includes a comparator function which, upon activation of the weight sensor 38, compares the sensed weight amount to a predetermined weight amount.

As shown herein, the engine 50 is in a first "on" mode and the second switch 52 is first "closed" position. The engine sensor 54 detects that the second switch 52 is in the first "closed" position and the vehicle electrical system processor 56 causes the vehicle electrical system transmitter 58 to transmit "on" signal 62 for receipt by the child car seat receiver 42, indicating that the engine is "on".

Upon the car seat processor 40 detecting that the car seat receiver 42 has received the "on" signal 62 from the vehicle electrical system 16, the car seat processor 40 causes the car seat transmitter 44 to move the first switch from a first "closed" position to a second "open" position.

When the first switch 36 is open as shown herein, an indication signal is not transmitted to the indicator 22 via indicator link 46. In the operation shown herein, the users would not hear/see the indicator 22 while the engine is on and the child is secured in the child car seat 28, shown in FIG. 1.

Figure 7:
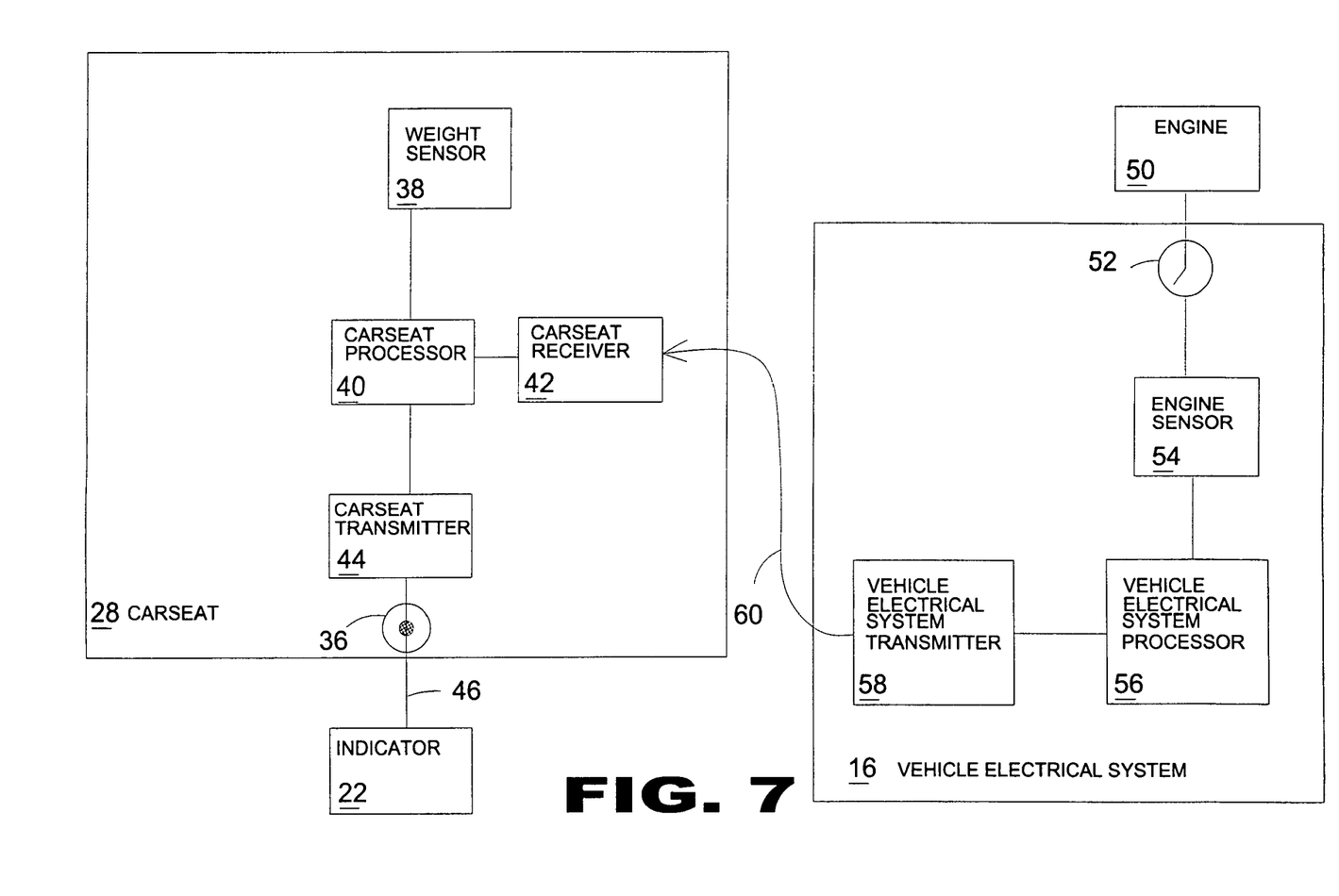
FIG. 7 is a block diagram of an alternative embodiment of the child car seat alert mechanism of the present invention.

FIG. 7 is a block diagram of the child car seat alert mechanism 10 of the present invention. The child car seat 28 includes the sensor 12 positioned therein. The sensor 12 contains a weight sensor 38, a child car seat receiver 42, a child car seat processor 40, a child car seat transmitter 44. The car seat transmitter 44 is connected to an external indicator 22 via a first switch 36 which controls activation of the indicator 22. The vehicle electrical system 16 is connected to the engine 50 of the vehicle via a second switch 52. The vehicle electrical system includes an engine sensor 54, a vehicle electrical system processor 56 and a vehicle electrical system transmitter 58.

Initially, upon a child being positioned within the car seat 28, the weight sensor 38 senses the weight of the child. The car seat processor 40 includes a comparator function which, upon activation of the weight sensor 38, compares the sensed weight amount to a predetermined weight amount.

As shown herein, the engine 50 is in a second "off" mode and the second switch 52 is second "open" position. The engine sensor 54 detects that the second switch 52 is in the second "open" position and the vehicle electrical system processor 56 causes the vehicle electrical system transmitter 58 to transmit "off" signal 60 for receipt by the child car seat receiver 42, indicating that the engine is "off".

Upon the car seat processor 40 detecting that the car seat receiver 42 has received the "off" signal 60 from the vehicle electrical system 16, the car seat processor 40, via a the comparator selectively determines if the weight sensor 38 senses a weight greater than the predetermined weight. If the sensed weight is greater than the predetermined weight and upon receipt of the "off" signal 60, the car seat processor 40 causes the car seat transmitter 44 to move the first switch 36 from second "open" to the first "closed" position.

When the first switch 36 is closed as shown herein, an indicator signal is transmitted via the indicator link 46 to the indicator 22. The indicator 22 at least one of visually and audibly alerts the user that a child remains in the car seat 28 after the engine 50 has been turned off.

In an alternative embodiment, the indicator 22 would also be activated when the child 26 exits the child car seat 28 while the engine 50 is on. This would alert the driver that the child 26 was able to get out of the child car seat 28 while the vehicle is on.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for alerting a user to the presence of a child in a vehicle comprising:
   a) a housing having a first sensor for sensing the presence of at least one of a child and an infant positioned therein;
   b) means connected to said first sensor for detecting the operative mode of a vehicle engine;
   c) means connected to said first sensor for indicating said presence to a third party; wherein said indicating means is activated and indicates to said third party said presence of said at least one of a child and an infant, upon said detecting means detecting said vehicle engine is in a first off mode and said first sensor sensing said presence of said at least one of a child and an infant;
   d) wherein said first sensor is a weight sensor for sensing a weight of said at least one of a child and an infant positioned within said housing; and
   e) a processor connected to each of said detecting means and said first sensor for comparing said sensed weight with a predetermined weight amount.

2. The device as recited in claim 1, wherein said housing is formed as a child car seat that is selectively connectable within a cabin of a vehicle.

3. The device as recited in claim 1, wherein said housing is formed as a seat of a vehicle formed integral with said vehicle.

4. The device as recited in claim 1, wherein said predetermined weight amount is an amount indicative that said at least one of a child and an infant is not positioned in said housing.

5. The device as recited in claim 1, wherein said processor is further connected between said first sensor and said indicating means and signals said indicating means to indicate to said third party said presence of said at least one of a child and an infant upon determining that said sensed weight is greater than said predetermined weight and that said vehicle engine is in said first off mode.

6. The device as recited in claim 1, wherein said detecting means is positioned within a vehicle electrical system.

7. The device as recited in claim 1, wherein said detecting means is connected to said vehicle engine and includes a second sensor for sensing said operative mode thereof and means for communicating said sensed operative mode via an operation signal to a child car seat receiver.

8. The device as recited in claim 7, further comprising a switch connected between said second sensor and said engine, wherein upon said engine being in said first off mode, said switch is in a first open position and upon said engine being in a second on mode, said switch is in a second closed position.

9. The device as recited in claim 8, wherein said operation signal is an off signal when said switch is in said first open position and said operation signal is an on signal when said switch is in said second closed position.

10. The device as recited in claim 1, wherein said indicating means is at least one of an audible alert, a visual alert, a vibrational alert and a verbal alert.

11. The device as recited in claim 1, further comprising a restraining mechanism connected to said housing for restraining said at least one of a child and an infant and therein.

12. The device as recited in claim 1, wherein said indicating means is positioned on at least one of an external surface of a vehicle and an internal surface of a vehicle.

13. The device as recited in claim 1, wherein said indicating means is a remote unit that is selectively transportable with said third party.

14. A device for alerting a user to the presence of a child in a vehicle comprising:
   a) a housing having a first sensor for sensing the presence of at least one of a child and an infant positioned therein;
   b) means connected to said first sensor for detecting the operative mode of a vehicle engine; and
   c) means connected to said first sensor for indicating said presence to a third party; wherein said indicating means is activated and indicates to said third party said presence of said at least one of a child and an infant, upon said detecting means detecting said vehicle engine is in a first off mode and said first sensor sensing said presence of said at least one of a child and an infant;
   d) wherein said detecting means is connected to said vehicle engine and includes a second sensor for sensing said operative mode thereof and means for communicating said sensed operative mode via an operation signal to a child car seat receiver; and
   e) a switch connected between said second sensor and said engine, wherein upon said engine being in said first off mode, said switch is in a first open position and upon said engine being in a second on mode, said switch is in a second closed position.

15. The device as recited in claim 14, wherein said housing is formed as a child car seat that is selectively connectable within a cabin of a vehicle.

16. The device as recited in claim 14, wherein said housing is formed as a seat of a vehicle formed integral with said vehicle.

17. The device as recited in claim 14, wherein said first sensor is a weight sensor for sensing a weight of said at least one of a child and an infant positioned within said housing.

18. The device as recited in claim 14, wherein said detecting means is positioned within a vehicle electrical system.

19. The device as recited in claim 14, wherein said operation signal is an off signal when said switch is in said first open position and said operation signal is an on signal when said switch is in said second closed position.

20. The device as recited in claim 14, wherein said indicating means is at least one of an audible alert, a visual alert, a vibrational alert and a verbal alert.

21. The device as recited in claim 14, further comprising a restraining mechanism connected to said housing for restraining said at least one of a child and an infant therein.

22. The device as recited in claim 14, wherein said indicating means is positioned on at least one of an external surface of a vehicle and an internal surface of a vehicle.

23. The device as recited in claim 14, wherein said indicating means is a remote unit that is selectively transportable with said third party.

\* \* \* \* \*